United States Patent [19]

Maturo et al.

[11] Patent Number: 4,536,797
[45] Date of Patent: Aug. 20, 1985

[54] TELEVISION RECEIVER WITH AUXILIARY ON-SCREEN DISPLAY

[75] Inventors: Robert J. Maturo, Brick; Danny Chin, Plainsboro; John G. N. Henderson, Princeton, all of N.J.

[73] Assignee: RCA Corporation, Princeton, N.J.

[21] Appl. No.: 541,075

[22] Filed: Oct. 12, 1983

[51] Int. Cl.³ .......................... H04N 5/44; H04N 5/22
[52] U.S. Cl. .................................. 358/192.1; 358/183; 358/191.1
[58] Field of Search ...................... 358/192.1, 183, 22, 358/191.1; 455/154; 340/723

[56] References Cited

U.S. PATENT DOCUMENTS

| 4,047,226 | 9/1977 | Hedges | 358/193 |
| 4,330,792 | 5/1982 | Naimpally | 358/33 |
| 4,390,902 | 6/1983 | Chin et al. | 358/192.1 |

Primary Examiner—Michael A. Masinick
Assistant Examiner—Howard L. Carter
Attorney, Agent, or Firm—P. J. Rasmussen; P. M. Emanuel; R. H. Kurdyla

[57] ABSTRACT

As a signal seeking tuner tunes through a number of channels to locate the next active (useable) channel, the display screen of a television receiver is blanked when the receiver is tuned between channels or to an inactive (unuseable) channel for which video signal information is substantially absent. Superimposed over the blanked screen background is a moveable tuning indicator bar, the position of which indicates the channel to which the receiver is tuned. The blanking of the screen prevents the tuning indication from being obscured by background noise.

4 Claims, 3 Drawing Figures

TELEVISION RECEIVER WITH AUXILIARY ON-SCREEN DISPLAY

This invention concerns a television receiver with provision for displaying auxiliary information on the screen of an image reproducing kinescope in addition to normal video signal information, wherein display screen blanking is provided in conjunction with the display of auxiliary information.

Many television receivers include provision for displaying auxiliary characters indicative of time, date or the number of the channel to which the receiver is tuned. The display of alphanumeric characters representative of channel tuning typically involves complex tuning systems and associated display character generators which are not suitable for use with lower cost television receivers.

A simple and inexpensive tuning indicator system suitable for use in low cost television receivers is described in U.S. Pat. No. 4,390,902—D. Chin et al. In that system a vertical bar tuning indicator is generated as the receiver is being tuned. The position of the bar with respect to channel representative numerals provided on a panel adjacent the display screen indicates the number of the channel to which the receiver is tuned at a given time. The tuning system is of the signal seeking type wherein the tuning indicator bar is caused to move across the screen in response to tuning voltages developed in a channel tuning mode in response to a viewer operated channel selector.

In accordance with the principles of the present invention, the display screen is blanked, and the tuning bar is superimposed over the blanked screen, when the receiver is tuned through an unused channel for which video information is absent, or when the receiver is tuned through a channel having video signal information which is so weak as to be virtually indistinguishable from displayed background noise (i.e., "snow").

In this regard it is herein recognized that, particularly in the case of a moving bar tuning indicator system, it is desirable to enable the viewer to clearly identify channels, including unused channels, to which the receiver is tuned at a particular time. In this case displayed background noise is particularly disturbing because with such a tuning system the viewer's eyes are directed at the tuning bar. In the absence of screen blanking around the tuning bar when the receiver is being tuned through unuseably weak or inactive channels, the tuning bar may appear distorted or obscured by displayed background noise ("snow" or "colored confetti"), making it difficult for the viewer to determine the number of the associated channel. The tuning bar can be largely obscured if the noisy background display is bright.

Such screen blanking is particularly advantageous when the receiver is being tuned through inactive or unuseably weak channels in the UHF television signal band. Although there are many UHF channels, in a given locale there are typically only a few active (i.e., "used") UHF channels. Therefore, a signal seeking tuning system may take a relatively long time to tune between used UHF channels and in that case background noise may be very disconcerting. Moreover, because of the large number of UHF channels their designation numbers provided on the panel adjacent the display screen tend to be spaced closely together. It would be difficult for a viewer to identify closely spaced UHF channels, e.g., channels 48 and 52, if the tuning bar is distorted or obscured by background noise produced in the absence of screen blanking.

Figures 1, 2:
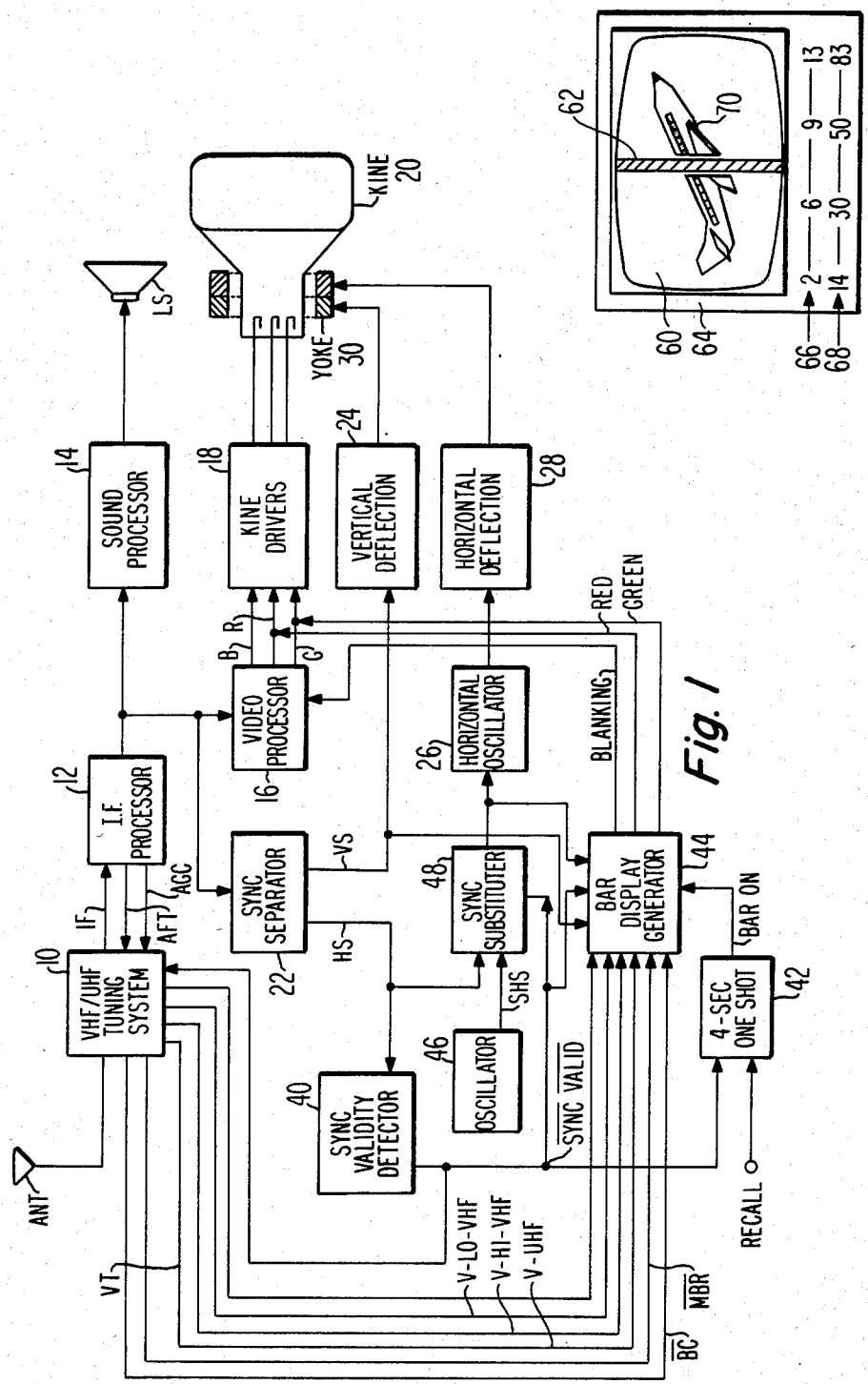
FIG. 1 is a block diagram of a television receiver including apparatus in accordance with the present invention.
FIG. 2 is a view of a television display.

In the television (TV) receiver shown in FIG. 1, TV signals are received by an antenna ANT and tuned by a tuning system 10. The TV signals correspond to e.g., channels 2–13 in the VHF frequency band and channels 14–83 in the UHF frequency band in the United States. Tuning system 10 includes a channel selector (not shown) operated by a viewer for initiating a channel changing operation whereby the next active channel is located by signal seeking apparatus to be described. Tuning system 10 develops band selection signals V-LO-VHF, V-HI-VHF and V-UHF for switching the frequency range of the tuner and developing a tuning voltage VT for controlling the frequency selectivity of the tuner. The intermediate frequency (IF) signal from tuning system 10 is applied to IF processor 12 which develops automatic fine tuning (AFT) and automatic gain control (AGC) signals for controlling tuning system 10.

Sound processor 14 develops from the IF signal an audio signal which is coupled to a loudspeaker LS. IF processor 16 develops from the IF signal a composite video signal. Video processor 16 develops blue (B), red (R) and green (G) color signals responsive to the composite video signal. Kinescope drivers 18 couple the B, R and G color signals to corresponding electrodes of kinescope 20. Sync separator 22 develops from the composite video signal vertical synchronization signal VS which is applied to vertical deflection circuits 24 for developing periodic vertical deflection signals for driving the vertical deflection portion of yoke 30. Except as described below horizontal synchronization signal HS developed by sync separator 22 is applied via a block 48, the function of which will be described, to horizontal oscillator 26 to synchronize it. Horizontal oscillator 26 drives horizontal deflection circuits 28 for developing periodic horizontal deflection signals in the horizontal portion of yoke 30. A picture display is developed on the screen of kinescope 20 in response to the B, R and G color video signals and the vertical and horizontal deflection signals.

Bar display generator 44 develops an on-screen tuning display as is shown in FIG. 2. Specifically, a vertical bar 62 is displayed on screen 60 at selected times. Channel numerals 66 for VHF channels 2–13 and channel numerals 68 for UHF channels 14–83 are provided on panel 64 proximate to screen 60. The horizontal position of bar 62 relative to channel numerals 66 and 68 indicates the channel number of the selected TV channel. As will be explained below and as set forth in greater detail in the aforementioned D. Chin et al. patent, when the bar is displayed after a new channel has been located and tuned, so that bar 62 appears uniform, uncontaminated and accentuated, picture information 70 is blanked in the vicinity of the portion of screen 60 where bar 62 is displayed. During the signal seeking process the bar moves leftward and rightward responsive to the tuning voltage.

Figure 3:
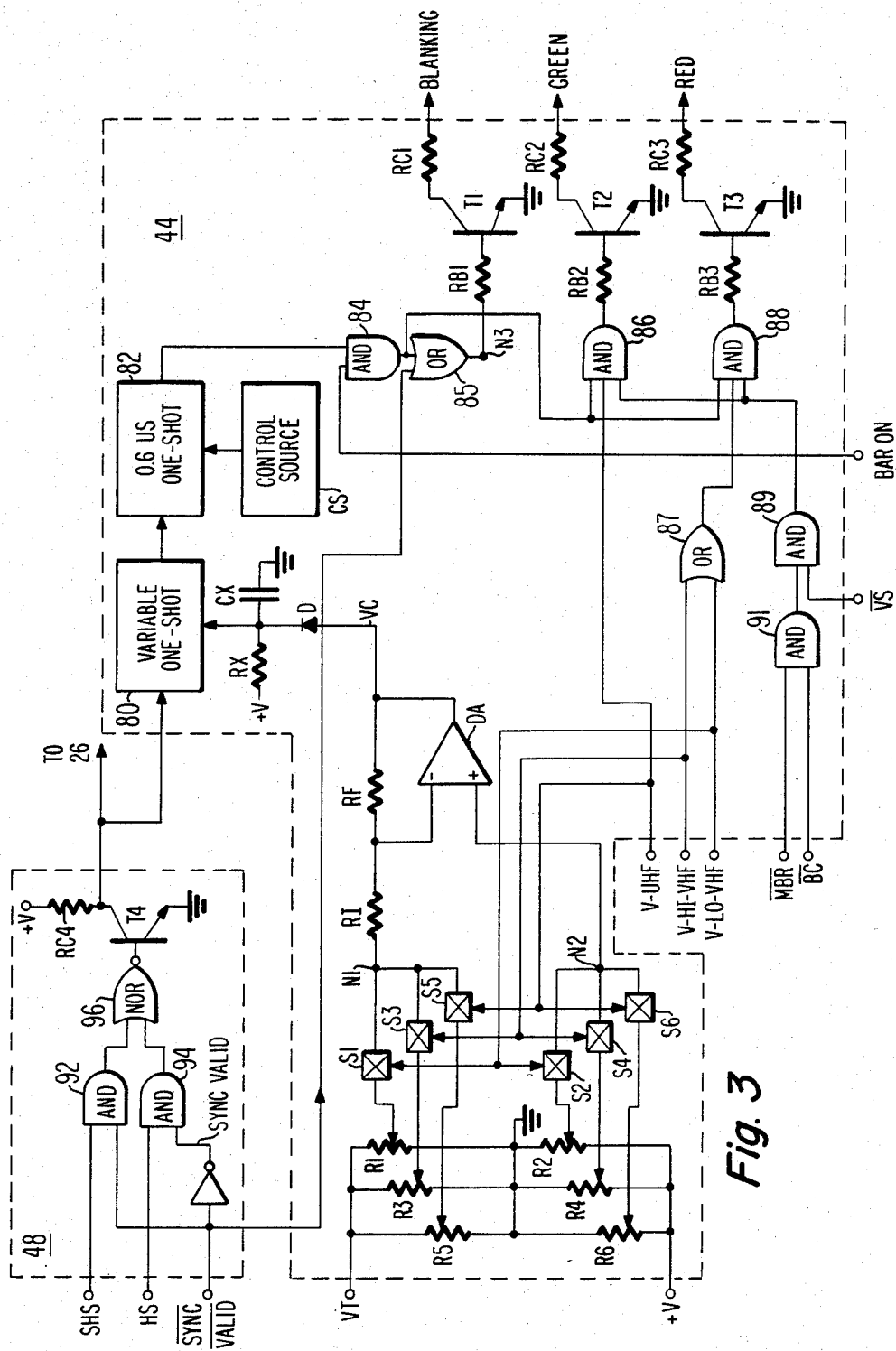
FIG. 3 is a diagram partially in block form and partially in schematic circuit form showing details of a portion of the apparatus in FIG. 1.

Bar display generator 44 develops control signal VC for positioning bar 62 on screen 60 and is described in detail with reference to FIG. 3. In FIG. 3, tuning voltage VT is divided by potentiometer voltage dividers R1, R3 and R5. The divided VT voltages at the wipers of R1, R3 and R5 are respectively coupled to node N1 through switches S1, S3 and S5. These switches are renderered respectively conductive by bandswitching signals V-LO-VHF, V-HI-VHF and V-UHF when the selected TV signal is in the lower VHF, upper VHF or UHF bands, respectively. In similar fashion, bar position offsetting voltages are developed at node N2 when the voltages at the respective wipers of potentiometers R2, R4 and R6, as developed from operating potential +V, are coupled to node N2 by respective switches S2, S4 and S6 when rendered respectively conductive by the aforementioned band signals.

Amplifier DA combines the divided version of tuning voltage VT at node N1 and the offsetting voltage at N2 to develop control signal VC which is coupled through diode D to the control terminal of variable time duration one-shot (monostable multivibrator) 80. Amplifier DA modifies the proportioned tuning voltage at N1 by a factor $-RF/RI$ and the offsetting voltage at N2 by a factor $[1+(RF/RI)]$, where RI and RF are the values of resistances RI and RF.

For low VHF channels 2-6, potentiometer R2 is adjusted to position bar 62 at numeral "2" of indicia 66 when channel 2 is selected, and potentiometer R1 is adjusted so that bar 62 is at numeral "6" of indicia 66 when channel 6 is selected. For high VHF channels 7-13, R4 is adjusted so that bar 62 is positioned at numeral "7" (not shown) of indicia 66 when channel 7 is selected, and R3 is adjusted to position bar 62 at numeral "13" when channel 13 is selected. For UHF channels 14-83, R6 is adjusted to position bar 62 at numeral "14" of indicia 68 when channel 14 is selected, and R5 is adjusted to position bar 62 at numeral "83" with channel 83 selected.

Variable one-shot 80 develops a trigger pulse signal at its output. The beginning of the trigger pulse signal substantially coincides with the synchronization pulse received from sync substitutor 48, the function of which will be described below, and the end of the trigger pulse signal is delayed from that synchronization pulse by a time period determined by the magnitude of the control signal received from the cathode of diode D. Resistor RX and capacitor CX determine the maximum duration of the trigger pulse and desirably limit it to be shorter than that of one horizontal line. The control signal VC reduces that duration by restricting the range of voltage over which CX is charged and discharged.

One-shot 82 produces a pulse signal at its output which commences at the termination of the trigger signal from one-shot 80 and which controls the width of the vertical tuning bar. The duratioh of the pulse from one-shot 82 is controlled by a signal from control source CS. Control source CS supplies a fixed magnitude control signal so that the pulse signal from one-shot 82 has a constant time duration substantially shorter than the period of the horizontal deflection signal, e.g., about 0.6 microseconds. That bar pulse signal is developed and applied to an input of AND gate 84 irrespective of whether a bar is to be displayed or not.

The output of AND gate 84 is coupled to an input of OR gate 85, which also receives as an input a SYNC VALID signal as will be described. When a tuning indication bar is to be displayed, a BAR ON signal exhibiting a "1" logic level is applied to the other input of AND gate 84 so that the bar pulse signal developed by one-shot 82 is coupled to node N3 via the output of AND gate 84 and OR gate 85. Generation of the BAR ON signal is described in detail later. The bar pulse is applied to common-emitter NPN driver transistor T1 via a base resistor RB1 and is coupled through resistor RC1 as a BLANKING signal. The BLANKING signal is applied to a blanking transistor in video processor 16. The timing of the BLANKING signal is responsive to tuning voltage VT by the operation of one-shot 80.

When the TV channel selected for viewing is in either the upper or lower portion of the VHF band, the appropriate one of band signals V-LO-VHF and V-HI-VHF are applied through OR-gate 87 to an input of AND gate 88 so that the bar pulse signal from the output of AND gate 84 is coupled to the red kinescope driver via resistor RB3, driver transistor T3 and resistor RC3 to develop a RED color video signal to produce a red-colored bar. Similarly, if the selected TV channel is in the UHF band, band signal V-UHF is applied to an input of AND gate 86 so that bar pulses from the output of AND gate 84 are coupled to the green kinescope driver via resistor RB2, driver T2 and resistor RC2 to develop a GREEN color video signal to produce a green-colored bar.

The bar display can be inhibited under certain conditions so that degradation of its appearance does not occur. The low logic level vertical retrace signal $\overline{VS}$ applied to AND gate 89 inhibits both AND gate 89 and AND gate 88 and thereby inhibits both RED and GREEN color video signals during the vertical retrace interval. Also, the RED and GREEN color video signals are inhibited by AND gate 91 in response to the low logic level band change signal $\overline{BC}$ when the tuning system changes from one band to another, such as between the VHF and UHF bands, and in response to the low logic level mid-band reset signal $\overline{MBR}$ when the tuner changes over the gap between channels 6 and 7 in the VHF band. As a result, the position of the bar display is not changed in a confusing manner due to transients of tuning voltage VT or of the bandswitch voltages when the tuning system changes between bands.

A bar tuning display is displayed whenever tuning is being performed and for a short time thereafter, e.g., four seconds. In addition, to refresh the viewer's memory as to which channel is being watched, a RECALL pushbutton is provided to recall the bar on demand for a short time, e.g., four seconds, after a channel has been tuned. Specifically, during the tuning process, sync validity detector 40 (FIG. 1) compares the average level of received synchronization signal HS against a threshold level to develop a SYNC VALID indication which is present during tuning until the next channel is located. A one-shot 42 develops the BAR ON signal continuously so long as SYNC VALID signal is applied and for four seconds after the SYNC VALID signal is removed when valid synchronization signals are detected. One-shot 42 also develops the BAR ON signal for a four-second period responsive to a RECALL signal developed, e.g., when the viewer depresses the RECALL pushbutton.

To avoid bar display tuning indication 62 from being jagged or erratic owing to the absence of an adequate sync signal between active channels, sync substitutor 48 (FIG. 1) ensures that appropriate synchronization signals are always applied to horizontal oscillator 26. To that end, oscillator 46 develops secondary horizontal synchronization signals SHS at the standard horizontal frequency, e.g., 15,575 Hz in the United States which are applied to sync substitutor 48. The received horizontal synchronization signals HS when present are also applied to sync substitutor 48. With respect to the detailed diagram of sync substitutor 48 shown in FIG. 3, SYNC VALID signal and the normal horizontal signal HS are applied to AND gate 94 and the SYNC VALID and secondary horizontal signal SHS are applied to AND gate 92. Normal synchronization signal HS is applied to NOR gate 96 when HS is present and valid, and secondary synchronization signal SHS is applied to NOR gate 96 when HS is not present or not valid. NOR gate 96, resistor RC4 and inverting buffer amplifier transistor T4 together comprise an OR gate to generate horizontal synchronization signals which are applied to horizontal oscillator 26.

With the exception of OR gate 85 and the SYNC VALID input signal connection thereto, the described tuning indicator system is as shown and discussed in U.S. Pat. No. 4,390,902—Chin et al., which is incorporated by reference herein.

In accordance with the principles of the present invention OR gate 85 serves to blank the entire kinescope display screen, except for the tuning bar indicator, when the receiver is being tuned to an unused, inactive channel for which video information is absent, and when the receiver is tuned to a channel having video signal information which is so weak with respect to a threshold level as to be virtually indistinguishable from displayed background noise. Under such conditions the synchronizing (sync) component of the received television signal is either absent or below a threshold level which is normally exceeded by the sync component in the case of strong, good quality video signals. In such cases the SYNC VALID signal applied to network 48 exhibits a "1" logic level which causes OR gate 85 to produce a "1" logic level output signal. Such output level from gate 85 renders transistor T1 conductive for the duration of such logic level signal, thereby blanking the display screen with the exception of the tuning bar. The tuning bar remains displayed for this condition because the screen BLANKING signal is applied to video processor 16 as shown in FIG. 1, while the enabling RED and GREEN tuning bar drive signals are applied to the video signal path subsequent to video processor 16, as also shown in FIG. 1.

Thus the tuning indicator bar is displayed clearly against a uniformly black screen background when the receiver is being tuned through inactive or unuseable channels, whereby the viewer can more readily identify inactive or unuseable channels.

What is claimed is:

1. In a television receiver including tuning means comprising a channel selector operable for selectably tuning said receiver from channel to channel; video signal processing means for processing video signals received from said tuning means; and image display means for reproducing on a viewing screen thereof an image in response to signals, including video signals from said video processing means, applied thereto, apparatus comprising:
   a source of auxiliary signal representative of character information for display by said image display means;
   means coupled to said display means and to said tuning means for selectively blanking said display means to produce a uniformly blanked screen display when said receiver is not tuned to a channel containing a predetermined amount of video information as said receiver is being tuned through a number of channels; and
   means for coupling said auxiliary signal to said display means for enabling said character information to be superimposed on said blanked screen display.

2. Apparatus according to claim 1, wherein
   said auxiliary signal information is indicative of the channel to which the receiver is tuned.

3. In a television receiver including tuning means comprising a channel selector operable for selectably tuning said receiver from channel to channel in response to a tuning voltage; video signal processing means for processing video signals received from said tuning means; and image display means for reproducing on a viewing screen thereof an image in response to signals, including video signals from said video processing means, applied thereto, apparatus comprising:
   tuning indicator means responsive to the condition of said tuning means for providing a signal representative of a tuning bar when displayed by said display means, said displayed tuning bar having a position determined by the magnitude of said tuning voltage;
   means coupled to said display means and to said tuning means for selectively blanking said display means to produce a uniformly blanked screen display when said receiver is not tuned to a channel containing a predetermined amount of video information as said receiver is being tuned through a number of channels; and
   means for coupling said representative tuning bar signal to said display means for enabling said tuning bar to be superimposed on said blanked screen display.

4. Apparatus according to claim 3, wherein
   said tuning means comprises a signal seeking tuner;
   channel designating numbers are provided in sequence on a panel adjacent to an edge of said viewing screen; and
   said displayed tuning bar is moveable in a direction perpendicular to the direction of said channel number sequence.

* * * * *

UNITED STATES PATENT AND TRADEMARK OFFICE
CERTIFICATE OF CORRECTION

PATENT NO. : 4,536,797

DATED : August 20, 1985

INVENTOR(S) : Robert Joseph Maturo et al.

It is certified that error appears in the above-identified patent and that said Letters Patent is hereby corrected as shown below:

Column 3, line 56, that portion reading "duratioh" should read --duration--. Column 4, line 53, that portion reading "SYNC VALID" should read --$\overline{\text{SYNC VALID}}$--. Column 4, line 56, that portion reading "SYNC VALID" should read --$\overline{\text{SYNC VALID}}$--. Column 4, line 57, that portion reading "SYNC VALID" should read --$\overline{\text{SYNC VALID}}$--. Column 5, line 7, that portion reading "SYNC VALID" should read --$\overline{\text{SYNC VALID}}$--. Column 5, line 8, that portion reading "SYNC VALID" should read --$\overline{\text{SYNC VALID}}$--. Column 5, lines 18-19, that portion reading "SYNC VALID" should read --$\overline{\text{SYNC VALID}}$--. Column 5, line 36, that portion reading "SYNC VALID" should read --$\overline{\text{SYNC VALID}}$--.

Signed and Sealed this

Nineteenth Day of November 1985

[SEAL]

Attest:

DONALD J. QUIGG

Attesting Officer

Commissioner of Patents and Trademarks